United States Patent
Ota

(10) Patent No.: US 9,170,469 B1
(45) Date of Patent: Oct. 27, 2015

(54) SYSTEM FOR CONTROLLING THE CHIRP OF AN OPTICAL SIGNAL

(71) Applicant: CANON KABUSHIKI KAISHA, Tokyo (JP)

(72) Inventor: Takefumi Ota, Tucson, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 14/261,295

(22) Filed: Apr. 24, 2014

(51) Int. Cl.
*G02F 1/03* (2006.01)
*G02F 1/35* (2006.01)

(52) U.S. Cl.
CPC ............. *G02F 1/353* (2013.01); *G02F 2203/25* (2013.01)

(58) Field of Classification Search
CPC ..................................................... G02B 5/1814
USPC .............. 359/245, 204.5, 211.6, 337.21, 563, 359/566, 569, 572
See application file for complete search history.

(56) References Cited

U.S. PATENT DOCUMENTS

| | | | |
|---|---|---|---|
| 4,006,963 A * | 2/1977 | Baues et al. | 385/37 |
| 4,076,381 A * | 2/1978 | Hammer | 385/8 |
| 4,571,024 A * | 2/1986 | Husbands | 385/37 |
| 5,581,642 A * | 12/1996 | Deacon et al. | 385/15 |
| 6,330,383 B1 | 12/2001 | Cai et al. | |
| 6,603,902 B1 | 8/2003 | So | |
| 6,640,020 B2 | 10/2003 | Nonov | |
| 6,643,429 B2 | 11/2003 | Robinson et al. | |
| 6,798,562 B2 | 9/2004 | Hakimi et al. | |
| 6,928,199 B2 | 8/2005 | Galstian et al. | |
| 7,539,359 B2 | 5/2009 | Kershteyn et al. | |
| 7,633,988 B2 | 12/2009 | Fish et al. | |
| 8,078,014 B1 | 12/2011 | Efimov | |
| 2008/0002746 A1 | 1/2008 | Narayan | |
| 2008/0049328 A1 | 2/2008 | Zhou | |
| 2012/0243820 A1 | 9/2012 | Hayakawa | |

FOREIGN PATENT DOCUMENTS

CN 102360147 A 2/2012

OTHER PUBLICATIONS

Raman Kashyap, Dispersion Enhancement of the Nonlinear Electro-Optical Effect, Nov. 13, 2006, Optics Express, 14 (23):11012-11017, Optical Society of America, Washington, D.C. 2006.
LiNbO3 Phase Modulator—LPM-001, Nov. 19, 2013, General Photonics Corporation, Chino, CA, 2013.
Hsiao-Yun Yu, Daniel Mahgerefteh, Pak S. Cho, Julius Goldhar, Improved Transmission of Chirped Signal from Semiconductor Devices by Pulse Reshaping Using a Fiber Bragg Grating Filter, , Optical Fiber Communication Conference, 1999, and the International Conference on Integrated Optics and Optical Fiber Communication, OFC/IOOC '99, Technical Digest, Feb. 21-26, 1999, vol. 4, pp. 8-10, IEEE, Piscataway, NJ, 1999.

* cited by examiner

*Primary Examiner* — Tuyen Tra
(74) *Attorney, Agent, or Firm* — Canon USA, Inc. I.P. Division

(57) ABSTRACT

An apparatus for altering a chirp of an input light comprising one or more grating structures and one or more electro-optical blocks. In which a voltage is applied to the one or more electro-optical blocks to alter a chirp of light exiting the apparatus.

18 Claims, 3 Drawing Sheets

SYSTEM FOR CONTROLLING THE CHIRP OF AN OPTICAL SIGNAL

BACKGROUND

1. Field of Art

Aspects of this disclosure are related to systems for controlling the chirp of an optical signal.

2. Description of the Related Art

In the context of the present disclosure, "chirp" refers to the manner in which the optical frequency changes over time. Chirp may also refer to the manner in which the optical frequency changes over time within the period of an optical pulse. An alternative definition of chirp is the time dependence of the instantaneous frequency of an optical pulse.

Several methods have been used in order to control the chirp of a pulse including: optical fibers, grating pairs, prism pairs, chirp mirrors, and chirped fiber Bragg gratings. For example, prior art methods have adjusted the chirp of a pulse by changing the distance between a pair of gratings or a pair of prisms.

There are several optical techniques in which the chirp of an optical pulse is an important parameter. When the chirp of the optical pulse is important, an optical system is often designed with a specific optical chirp. This is often accomplished with a chirped fiber Bragg grating. It is often advantageous to change the chirp of an optical pulse. This sometimes accomplished by using an optical switch in combination with a variety chirped fiber Bragg gratings with different chirps, or by changing the environment (temperature, tension, voltage) of the chirped fiber Bragg grating. Other mechanical methods of adjusting the chirp are also used, such as changing the distance between a pair of grating.

The present techniques have problems with reliability, speed, flexibility, and power handling. This present disclosure aims to address these issues.

SUMMARY

Embodiments of the present disclosure provide an apparatus for varying the chirp.

According to an aspect of the present disclosure an apparatus for altering a chirp of an input light comprising: a first grating structure positioned to receive the input light to produce a first dispersed light; a first electro-optical block positioned relative to the first grating structure to receive the first dispersed light which exits the first electro-optical block as a second dispersed light; a second grating structure positioned relative to the first electro-optical block to receive the second dispersed light to produce a first collinear light; a third grating structure positioned relative to the second grating structure to receive the first collinear light to produce a third dispersed light; a second electro-optical block positioned relative to the third grating structure to receive the third dispersed light which exits the second electro-optical block as a fourth dispersed light; a fourth grating structure positioned relative to the second electro-optical block to receive the fourth dispersed light to produce an output light. A voltage applied to the first and second electro-optical blocks alters the chirp of the output light.

The apparatus may further comprise one or more mirrors positioned relative the second grating structure to reflect the first collinear light into the third grating structure. The first electro-optical block and the second electro-optical block may be the same electro-optical block.

The first grating structure and the fourth grating structure maybe the same grating structure. The second grating structure and the third grating structure maybe the same grating structure. The first grating structure, second grating structure third grating structure, and the fourth grating structure maybe the same grating structure.

Varying the voltage may vary the chirp of the output light and may not shift a position at which the output light exits the fourth grating structure more than an alignment tolerance. Varying the voltage may vary the chirp of the output light and may not shift an angle at which the output light exits the fourth grating structure more than an alignment tolerance.

The first grating structure, the second grating structure, the third grating structure, and the fourth grating structure maybe transmission gratings. The first grating structure, the second grating structure, the third grating structure, and the fourth grating structure maybe reflection gratings.

A group of grating structures includes the first grating structure; the second grating structure; the third grating structure; and the fourth grating structure. Grooves, slits, or edges of the group of grating structures maybe aligned with a crystalline axis of the EO material.

The first grating structure; the second grating structure; the third grating structure; and the fourth grating structure maybe all blazed. The apparatus may also include a polarizer that receives the input light and passes polarized input light to the first grating structure. A group of electro-optical blocks include the first electro-optical block and the second electro-optical block. The group of grating structures maybe formed on the group of electro-optical blocks.

Another aspect of the present embodiment is an apparatus for altering a chirp of an input light comprising: a grating structure; and an electro-optical block. The input light is spatially dispersed by the grating structure a series of four times. After the input light is dispersed by the grating structure the first time it passes through the electro-optical block a first time. After the input light is dispersed by the grating structure the third time it passes through the electro-optical block a second time. After the input light is dispersed a fourth time by the grating structure it is output as chirped output light. A voltage applied to the electro-optical block alters the chirp of the output light.

The grating structure may comprise a first grating structure and a second grating structure. The grating structure may comprise a first grating structure, a second grating structure, a third grating structure, and a fourth grating structure. The electro-optical block may comprise a first electro-optical block and a second electro-optical block.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments. Similar reference numerals refer to similar parts.

DESCRIPTION OF THE EMBODIMENTS

Embodiments will be described below with reference to the attached drawings.

Figure 1:
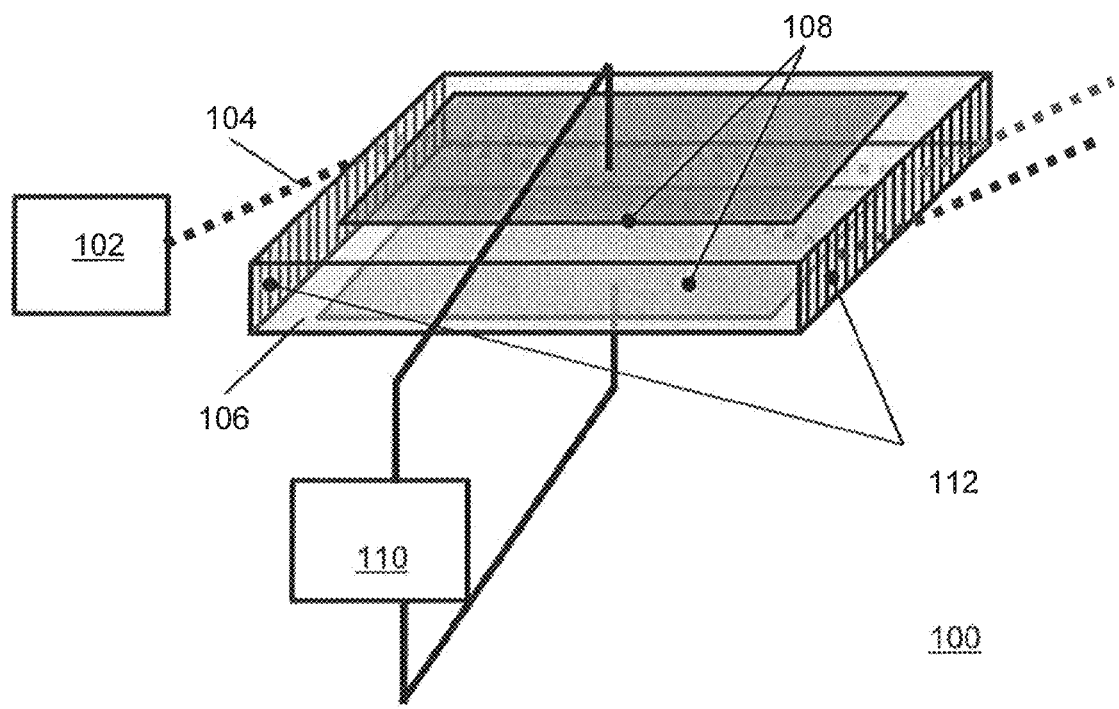
FIG. 1 illustrates an apparatus for controlling chirp.

The present disclosure is a new apparatus for controlling the chirp of an optical pulse. FIG. 1 is an illustration of a system 100 that produces a chirped pulse. The system 100 includes a light source 102 that produces a broadband pulsed input light 104. The system includes an Electro-Optical (EO) material 106. The refractive index ($n_2$) of the EO material 106 can be changed by applying a voltage via electrodes 108. The voltage is applied with a voltage source 110. The voltage source may be a DC voltage source or a function generator. The EO material 106 includes grating structures 112 on the input and output faces of the EO material 106.

The grating structures 112 may be transmission gratings that are attached to the faces of the EO material 106 or placed close to the faces of the EO material. The gratings structures may be adjacent to the EO material 106 and index matching fluid may be between the gratings structures 112 and the EO material. The grating structures 112 may be manufactured as an integral part of the EO material 106. The grating structures 112 may be made by mechanical ruling lines upon the input and output faces of the EO material 106. This may be done by burnishing grooves into the EO material 106 with a mechanical tool. A thin film may be applied to the input and output faces of the EO material and the grating structures 112 may be formed in the thin film. The grating structures 112 may also be formed using light exposure methods. Chemical etching and/or ion bombardment techniques may be used to form the gratings. The grating structures 112 may also be blazed. The grating structures 112 may be formed as a plurality of slits.

Figure 2:
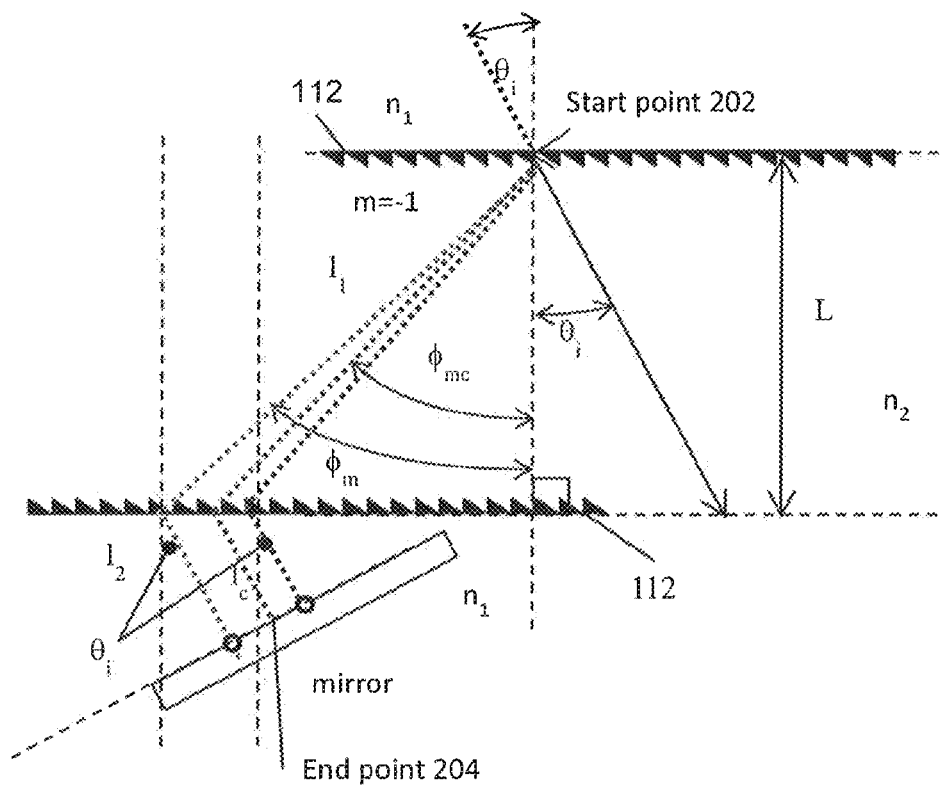
FIG. 2 illustrates a portion of an apparatus for controlling chirp.

FIG. 2 is an illustration of the optical path that light follows through the system 100. The grating structures 112 spatially disperse light according Equation (1).

$$m\lambda d = n_1 \sin(\theta_i) + n_2 \sin(\phi_m) \quad (1)$$

m: Diffraction order, wherein m is an integer and is not zero i.e. ( . . . −3, −2, −1, 1, 2, 3 . . . )
d: Grating line number [line/m]
$\lambda$: Wavelength [m]
$\theta_i$: Input light angle
$\phi_m$: Diffracted light angle
$n_1$: Refractive index of material outside the EO material 106
$n_2$: Refractive index of the EO material 106

The distance $l_{(\lambda)}$ that light travels from start point 202 to end point 204 is described by equation (2).

$$l_{(\lambda)} = l_{(\lambda)} = l_1 + l_2 \quad (2)$$

$$= \frac{n_2 L}{\cos(\phi_m)} + n_2 L(\tan(\phi_m) - \tan(\phi_{mc}))\sin(\theta_i) + l_c$$

$l_1$: Distance between gratings for each wavelength
$l_2$: Distance from 2nd grating to mirror for each wavelength
L: Distance between grating pair
$l_c$: Distance between 2nd grating and mirror for center wavelength $\lambda_c$
$\phi_{mc}$: Angle of diffracted light for center wavelength $\lambda_c$ When the material between the diffraction gratings 112 is an EO material 106 the refractive index $n_2$ can be changed. Equation 3 describes how that change affects the distance that the light travels.

$$l_{(\lambda)} = \frac{n_2(1 + \Delta n)L}{\cos(\phi_m)} + n_2 L(\tan(\phi_m) - \tan(\phi_{mc}))\sin(\theta_i) + l_c \quad (3)$$

$\Delta$: Ratio of index change of the EO material

The instantaneous chirp $\kappa$ added by the system may be characterized by equation 4a below. The instantaneous chirp $\kappa$ may be divided into two terms $\kappa_0$ and $\kappa_\Delta$. $\kappa_0$ is the static instantaneous chirp and $\kappa_\Delta$ is the dynamic instantaneous chirp. Another parameter of interest is the differential chirp $\Delta\kappa$ which is described in equation 4b. In which the chirp measured between two wavelengths $\lambda_1$ and $\lambda_2$. Likewise, the differential chirp $\Delta\kappa$ may be divided into two terms $\Delta\kappa_0$ and $\Delta\kappa_\Delta$. $\Delta\kappa_0$ is the static differential chirp and $\Delta\kappa_\Delta$ is the dynamic differential chirp.

$$\kappa = c\frac{dl_{(\lambda)}}{d\lambda} = \kappa_0 + \kappa_\Delta \quad (4a)$$

$$\kappa_0 = cL\frac{d}{d\lambda}(n_2 \sec(\phi_m) + n_2 \sin(\theta_i)(\tan(\phi_m) - \tan(\phi_{mc})))$$

$$\kappa_\Delta = cL\frac{d}{d\lambda}(n_2 \Delta n \sec(\phi_m))$$

$$\Delta\kappa = c\frac{\Delta l_\lambda}{\Delta \lambda} = \frac{\Delta l_{\lambda_2} - \Delta l_{\lambda_2}}{\lambda_2 - \lambda_1} = \Delta\kappa_0 + \Delta\kappa_\Delta$$

$$\Delta\kappa_0 = cL(n_2(\lambda_2)\sec(\phi_m(\lambda_2)) + n_2(\lambda_2)\sin(\theta_i)(\tan(\phi_m(\lambda_2)) - \tan(\phi_{mc})) - \quad (4b)$$
$$(n_2(\lambda_1)\sec(\phi_m(\lambda_1)) + n_2(\lambda_1)\sin(\theta_i)(\tan(\phi_m(\lambda_1)) - \tan(\phi_{mc}))))$$
$$\Delta\kappa_\Delta = cL(n_2(\lambda_2)\Delta n(\lambda_2)\sec(\phi_m(\lambda_2)) - n_2(\lambda_1)\Delta n(\lambda_1)\sec(\phi_m(\lambda_1)))$$

When a voltage is applied to EO material the chirp is changed, but the position and angle at which the chirped light exits the system does not change. The gratings and mirrors are arranged in this system such that whatever change may occur is due to varying the voltage is within the alignment tolerance of the chirped output light. The alignment tolerance depends upon the numerical aperture of the lens used to output the light.

First Embodiment

Figure 3:
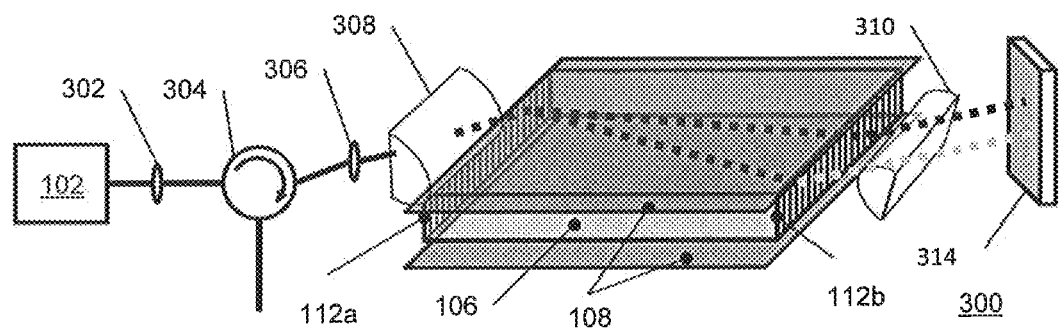
FIG. 3 illustrates an apparatus for controlling chirp in a first embodiment.

FIG. 3 is an illustration of a first embodiment a system 300 that produces a chirped pulse. The system 300 includes a light source 102 that produces a broadband pulsed input light 104. The system also includes an EO material 106. An example of a suitable EO material is MgO:LiNbO3. The refractive index ($n_2$) of the EO material 106 can be changed by applying a voltage via electrodes 108. The EO material 106 includes grating structures 112 on the input face and the output face of the EO material 106. A first lens 302 may couple the light 104 into a first port of a circulator 304. Light that enters the first port of the circulator 304 exits via a second port of the circulator 304 and into a lens 306. The light exiting lens 306 is then coupled into a lens 308. The light exiting lens 308 then passes through a first grating structure 112a at an incident angle 6. The first grating structure diffracts the light such that light with different wavelengths reach the second grating structure 112b at different times and at different points in space as it passes through EO material 106.

The second grating structure 112b is arranged such that light which is diffracted into order m is then re-diffracted into the same order m and exits the second grating structure 112b at an angle that is substantially similar to the incident angle $\theta_i$. The light exiting the grating structure 112b then enters a lens 310. Light exiting the lens 310 is then reflected back by a mirror 314 through components 310, 112b, 106, 112a, 308, and 306, and into the second port of the circulator 304. The mirror 314 is positioned such that the plane of the mirror forms an angle with the second grating structure 112b that is substantially similar to the incident angle $\theta_i$. The light inputted into the second port of the circulator 304 then exits the third port of the circulator as a chirped pulse. In which the chirp of the pulse may be adjusted by applying a voltage to electrodes 108.

The EO material 106 may be made from MgO:LiNbO3 and it may be 5 mm×5 mm×8 μm (W×L×H). The wavelength dependence of the refractive index of MgO:LiNbO3 can be approximated using equations (5):

$$(n_{2o}(\lambda))^2 = 4.8762 + \frac{0.11554}{\lambda^2 - 0.04674} - 0.033119\lambda^2 \quad (5)$$

$$(n_{2e}(\lambda))^2 = 4.5469 + \frac{0.094779}{\lambda^2 - 0.04439} - 0.026721\lambda^2$$

In which $n_{2o}$ is the ordinary refractive index and $n_{2e}$ is the extraordinary refractive index. The units of λ as used in equation (4) are in μm.

The change in refractive index for MgO:LiNbO3 may be described using equation (6).

$$\Delta n_{2o} = -\frac{1}{2} n_{2o}^3 \gamma_{13} \frac{V}{D} \quad (6)$$

$$\Delta n_{2e} = -\frac{1}{2} n_{2e}^3 \gamma_{13} \frac{V}{D}$$

$\gamma_{13}$: Electro-optic coefficient for MgO:LiNbO3 is 18 pm/V
V: The input voltage applied to the EO material 106 is −1 kV to 1 kV
D: The thickness of the EO material 106 is 8 μm
d: Grating line number 0.900 lines/μm=1 E-3/1 E-6

The center wavelength $\lambda_c$ of the input light is 1.5 μm, the shape of the input pulse is such like, and the pulse width is 100 fs. The incident angle $\theta_i$ is 28°. The EO material is arranged so that the input pulse propagates along the ordinary axis. As input voltage is changed from −1 kV to 1 kV, the temporal pulse width is changed from 4.6 ps to 4.73 ps.

Second Embodiment

Figure 4:
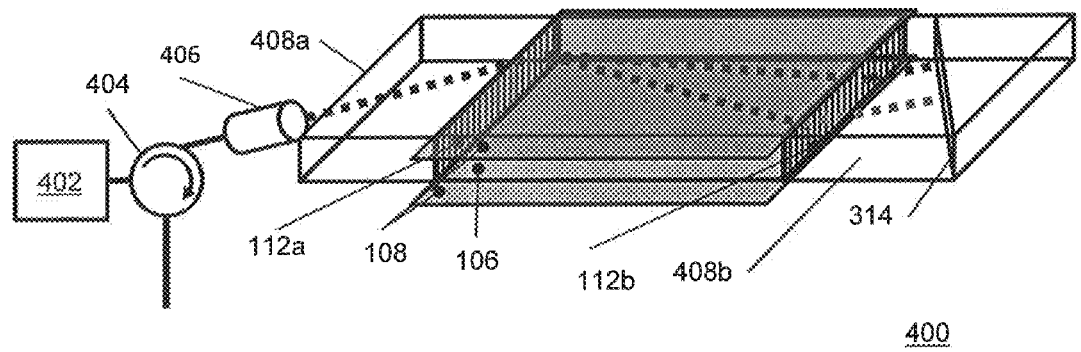
FIG. 4 illustrates an apparatus for controlling chirp in a second embodiment.

FIG. 4 is an illustration of a second embodiment a system 400 that produces a chirped pulse. The system 400 is substantially similar to system 300. The system 400 includes a fiber coupled light source 402 that produces a broadband pulsed input light 104. The fiber coupled light source 402 is coupled to a first port of a fiber coupled circulator 404. Light that enters the first port of the circulator 404 exits via a second port of the fiber coupled circulator 404 and into a GRIN lens 406. The light exiting the GRIN lens 406 then enters a first optical block 408a. The first optical block 408a has a refractive index of $n_1$. The first optical block 408a may be made out of silica or some other suitable optical material.

After passing through the first optical block 408a the light then strikes a first grating structure 112a at an incident angle $\theta_i$. The first grating structure 112a is between the first optical block 408a and an EO material 106. The first grating structure 112a may be formed on the first optical block 408a, the EO material 106, or may be a separate item. The first grating structure 112a diffracts the light such that light with different wavelengths reaches a second grating structure 112b at different times and at different points in space as it passes through EO material 106. The second grating structure 112b may be formed on a second optical block 408b, the EO material 106, or may be a separate item. The second optical block 408b may have a refractive index of $n_1$. The second optical block 408a may be made out of silica or some other suitable optical material. A mirror 314 may be formed within the optical block 408a. The second optical block 408a may take the form of a prism or a wedge. The mirror 314 may be formed on a face of the second optical block 408a either as a thin film or as an effective mirror due to total internal reflection. The mirror 314 then reflects the light back through components 408b, 112b, 106, 112a, 408a, and 406, and back into the second port of the fiber coupled circulator 404. The mirror 314 is positioned such that the plane of the mirror forms an angle with the second grating structure 112b that is substantially similar to the incident angle $\theta_i$. The light inputted into the second port of the fiber coupled circulator 404 then exits the third port of the fiber coupled circulator 404 as a chirped pulse. In which the chirp of the pulse may be adjusted by applying a voltage.

In an alternative embodiment, the refractive index of the first optical block 408a may be different from the refractive index of the second optical block 408b. The light exiting the GRIN lens may be collimated or set to be focused back onto the GRIN lens 406 once it has passed through all the intervening optical components.

One advantage of the second embodiment over the first embodiment is a reduction in the need for free space optical alignment.

Third Embodiment

Figure 5:
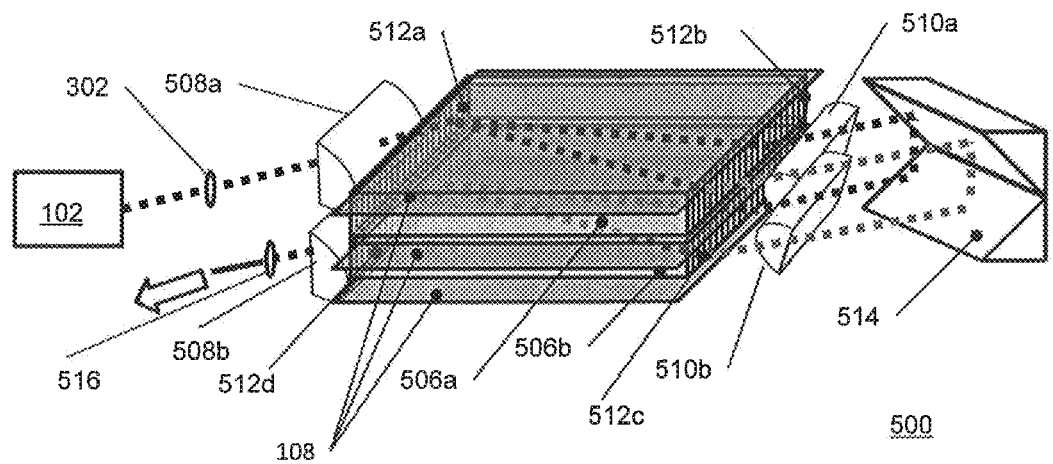
FIG. 5 illustrates an apparatus for controlling chirp in a third embodiment.

FIG. 5 is an illustration of a third embodiment, a system 500, which produces a chirped pulse. The system 500 is substantially similar to system 300. The system 500 includes a light source 102 that produces a broadband pulsed input light 104. The system 500 includes a first EO material 506a and a second EO material 506b. The EO materials 506a-b include grating structures 512a-d on the input and the output faces of the EO materials 506a-b. The light from the light source 102 is coupled by a first lens 302 into a second lens 508a The light exiting lens 508a then passes through a first grating structure 512a at an incident angle $\theta_i$. The first grating structure 512a diffracts the light which then passes through the first EO material 506a. After passing through the first EO material 506a the second grating structure 512b diffracts the light again. The second grating structure 512b is arranged such that light with different wavelengths exit the second grating structure 512b at an angle that are substantially parallel to each other (collinear) but are spatially separated. The light may then pass through a lens 510a and onto a mirrored structure 514 which reflects the light through a third lens 510c.

The light exiting lens 510c then passes through a third grating structure 512c. The third grating structure 512c diffracts the light which then passes through the second EO material 506b. After passing through the second EO material 506b the fourth grating structure 512d diffracts the light again. The fourth grating structure 512d is arranged such that light with different wavelengths exit the fourth grating structure 512d at with substantially the same angle are not spatially separated but are separated in time. The light exiting the fourth grating structure 512d then enters a lens 508b and exits via an output lens 516. The output light will have a chirp that can be controlled with a voltage across the electrodes 108.

One advantage of this embodiment is the isolation of the input from the output without having to include a circulator. This embodiment also expands the flexibility to the chirp that may be applied to light. The EO materials 506a-b may have different or identical electro-optical properties. Different or identical voltages may be applied to the EO materials or they may have the same voltage applied to them via electrodes 108. If the EO materials are different and/or the voltages are different then the structure may be adjusted to minimize the different spatial chromatic dispersions between the forward path and the return path.

Fourth Embodiment

Figure 6:
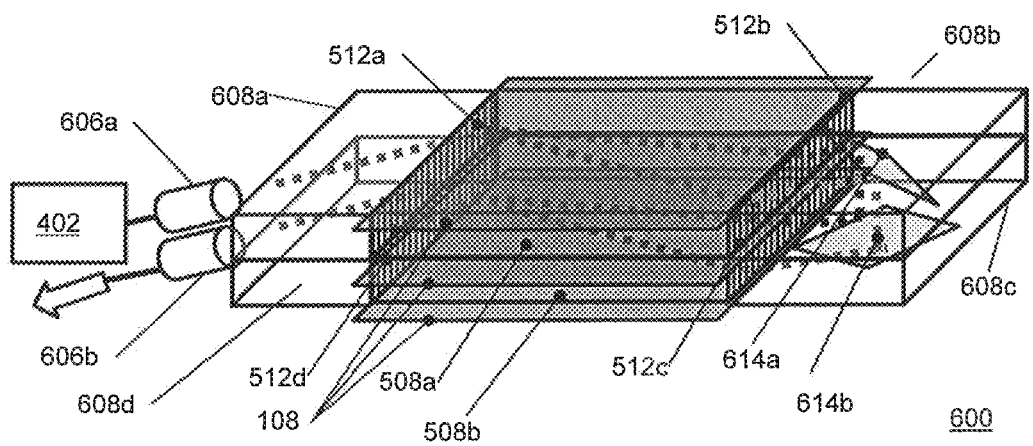
FIG. 6 illustrates an apparatus for controlling chirp in a fourth embodiment.

FIG. 6 is an illustration of a fourth embodiment, a system 600, which produces a chirped pulse. The system 600 is substantially similar to systems 400 and 500. The system 600 includes a fiber coupled light source 102 that produces a broadband pulsed input light 104. The fiber coupled light source 402 is coupled to a GRIN lens 606a. The light exiting the GRIN lens 606 then enters a first optical block 608a. The system 600 includes EO materials 506a-b. The system 600 includes grating structures 512a-d.

After passing through the first optical block 608a the light then strikes the first grating structure 512a at an incident angle $\theta_i$. The first grating structure 512a is between the first optical block 608a and the first EO material 506a. The first grating structure 512a diffracts the light which then passes through the first EO material 506a. The second grating structure 512b is between the first EO material 506a and the second optical block 608b. The light is then diffracted by the second grating structure 512b and then passes through the optical block 608b.

A mirror 614a then reflects the light into a third optical block 608c and is then reflected by a second mirror 614b. Alternatively, the second and third optical blocks 608b-c may take the form of prisms or wedges. The mirrors 614a-b may be formed on a face of the optical blocks 608b-c either as a thin film or as an effective mirror due to total internal reflection.

The light then passes back through a third diffraction grating 512c, a second EO material 508b, a fourth diffraction grating 512d, a fourth optical block 608d, and a grin lens 60d before exiting an optical fiber as a chirped optical light. In which the chirp of the pulse may be adjusted by applying a voltage to electrodes 108.

The first optical block 608a and the fourth optical block 608b may be combined into a single input/output optical block. The first grating structure 512a and the fourth grating structure 512d may be combined into a single input/output grating structure. The second grating structure 512b and the third grating structure 512c may be combined into a single intermediate grating structure. The second optical block 608b and the third optical block 608b may be combined into an intermediate reflective optical block.

An advantage of the fourth embodiment that there is no need for a circulator and there is no free space alignment.

Fifth Embodiment

A fifth embodiment of the system may include a single grating structure instead of multiple grating structures. Light enters a single grating structure at an incident angle 6. The light passes through a first grating structure and then through a first EO material. A second mirror that is parallel to the grating structure at the end of EO material may be used to reflect the light back through for a second pass through the EO material and through the first grating structure for a second time. The light may then be reflected back by a first mirror which is at an angle to the grating structure and then back through for a third pass through the grating structure. The light then passes through the EO material a third time before being reflected by the second mirror a second time and passing through the EO material a fourth time before passing though the grating structure for the fourth time. After light passes through the grating structure for the fourth time, the light exits the system with a chirp that can be controlled by a voltage applied across the EO material.

The first mirror is positioned such that when light exits the system after it has passed though these dispersive structures the spatial chromatic dispersion is low and the temporal chromatic dispersion is adjustable. In an embodiment, the second mirror is positioned such that after the light has passed through the grating structure for the fourth time it may exit the grating structure at substantially the same angle as the incident angle. Also, as the light passes through the grating structure for the fourth time it exits the grating structure at substantially the same position that it enters the grating structure for the first time. Alternatively, the first mirror may be positioned such that after light passes through the grating structure for the fourth time it exits the grating structure at a different position from where it entered the grating structure the first time.

The first embodiment is transformed into the fifth embodiment by cutting the system in half placing a mirror at a L/2 within the EO material and folding the second half of the system such that it adjacent to the first half. The same transformation may be applied to the second through fourth embodiments.

The diffraction gratings depending upon their design and the angle of light incident upon their diffraction surfaces, spatial disperse light over one or more diffraction modes. Apertures may be formed in various parts of the chirping system to ensure that only one of these diffraction modes exits the chirping system. The mirror may act as a first aperture. The chirped light may also pass through a second aperture after it has passed through all the grating structures before exiting the system.

The rulings, grooves, or slits of the gratings may be aligned with a crystalline axis of the EO materials. This may be used to line up the polarization dependence of the gratings and the EO materials. The system may include a polarizer between an optical source and the gratings. This may be used minimize whatever polarization effects there are in the system.

These systems are typically used with a pulsed input signal 104. When the light source 102 is operated in a continuous wave mode then the chirp becomes a chirp in the phase of the output signal. The chirp in this context refers to a wavelength dependence of the phase retardation which is adjustable by changing the applied voltage.

The embodiments described above make use of transmission grating structures. The system may also be adapted to make use of reflection grating structures without going beyond the spirit of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus for altering a chirp of an input light comprising:

a first grating structure positioned to receive the input light to produce a first dispersed light;

a first electro-optical block positioned relative to the first grating structure to receive the first dispersed light which exits the first electro-optical block as a second dispersed light;

a second grating structure positioned relative to the first electro-optical block to receive the second dispersed light to produce a first collinear light;

a third grating structure positioned relative to the second grating structure to receive the first collinear light to produce a third dispersed light;

a second electro-optical block positioned relative to the third grating structure to receive the third dispersed light which exits the second electro-optical block as a fourth dispersed light;

a fourth grating structure positioned relative to the second electro-optical block to receive the fourth dispersed light to produce an output light; and wherein a voltage applied to the first and second electro-optical blocks alters the chirp of the output light.

2. The apparatus of claim 1 further comprising:
one or more mirrors positioned relative the second grating structure to reflect the first collinear light into the third grating structure.

3. The apparatus of claim 1 wherein the first electro-optical block and the second electro-optical block are the same electro-optical block.

4. The apparatus of claim 1 wherein the first grating structure and the fourth grating structure are the same grating structure.

5. The apparatus of claim 1 wherein the second grating structure and the third grating structure are the same grating structure.

6. The apparatus of claim 1 wherein the first grating structure, second grating structure third grating structure, and the fourth grating structure are the same grating structure.

7. The apparatus of claim 1 wherein varying the voltage, varies the chirp of the output light and does not shift a position at which the output light exits the fourth grating structure more than an alignment tolerance.

8. The apparatus of claim 1 wherein varying the voltage, varies the chirp of the output light and does not shift an angle at which the output light exits the fourth grating structure more than an alignment tolerance.

9. The apparatus of claim 1 wherein the first grating structure, the second grating structure, the third grating structure, and the fourth grating structure are transmission gratings.

10. The apparatus of claim 1 further comprising one or more apertures to limit which diffraction modes exit the apparatus.

11. The apparatus of claim 1 wherein,
a group of grating structures include the first grating structure; the second grating structure; the third grating structure; and the fourth grating structure; and grooves, slits, or edges of the group of grating structures are aligned with a crystalline axis of the EO material.

12. The apparatus of claim 1 wherein, the first grating structure; the second grating structure; the third grating structure; and the fourth grating structure are all blazed.

13. The apparatus of claim 1 further comprising a polarizer that receives the input light and passes polarized input light to the first grating structure.

14. The apparatus of claim 1 wherein,
a group of grating structures include the first grating structure, the second grating structure, the third grating structure, and the fourth grating structure; and a group of electro-optical blocks include the first electro-optical block and the second electro-optical block; and the group of grating structures are formed on the group of electro-optical blocks.

15. An apparatus for altering a chirp of an input light comprising:
a grating structure; and
an electro-optical block;
wherein the input light is spatially dispersed by the grating structure a series of four times;

wherein after the input light is dispersed by the grating structure the first time it passes through the electro-optical block a first time;

wherein after the input light is dispersed by the grating structure the third time it passes through the electro-optical block a second time;

wherein after the input light is dispersed a fourth time by the grating structure it is output as chirped output light; and wherein a voltage applied to the electro-optical block alters the chirp of the output light.

16. The apparatus of claim 15 wherein,
wherein the grating structure comprises a first grating structure and a second grating structure.

17. The apparatus of claim 15 wherein,
wherein the grating structure comprises a first grating structure, a second grating structure, a third grating structure, and a fourth grating structure.

18. The apparatus of claim 15 wherein,
wherein the electro-optical block comprises a first electro-optical block and a second electro-optical block.

* * * * *